US006533889B2

(12) United States Patent
Dueholm

(10) Patent No.: US 6,533,889 B2
(45) Date of Patent: Mar. 18, 2003

(54) METHOD OF MANUFACTURING CHIPBOARDS, FIBRE BOARDS AND THE LIKE BOARDS

(75) Inventor: Sten Dueholm, Copenhagen K (DK)

(73) Assignee: Wesser & Dueholm, Hellerup (DK)

(*) Notice: Subject to any disclaimer, the term of this patent is extended or adjusted under 35 U.S.C. 154(b) by 0 days.

(21) Appl. No.: 09/380,627

(22) PCT Filed: Mar. 10, 1998

(86) PCT No.: PCT/DK98/00090

§ 371 (c)(1),
(2), (4) Date: Sep. 20, 1999

(87) PCT Pub. No.: WO98/41372

PCT Pub. Date: Sep. 24, 1998

(65) Prior Publication Data

US 2002/0036046 A1 Mar. 28, 2002

(30) Foreign Application Priority Data

Mar. 18, 1997 (DK) .............................................. 0302/97

(51) Int. Cl.[7] ............................ B27N 3/12; B29C 59/04

(52) U.S. Cl. ....................... 156/296; 156/312; 156/358; 156/360; 156/583.5; 264/109; 264/DIG. 65

(58) Field of Search ............................... 156/62.2, 296, 156/583.1, 583.5, 312, 358, 360; 264/109, DIG. 65

(56) References Cited

U.S. PATENT DOCUMENTS

| | | | | |
|---|---|---|---|---|
| 3,779,843 A | | 12/1973 | Knapp | 156/64 |
| 4,393,019 A | * | 7/1983 | Geimer | 264/109 |
| 4,574,624 A | | 3/1986 | Lehtinen et al. | |
| 5,063,010 A | | 11/1991 | Fischer et al. | |
| 5,942,174 A | | 8/1999 | Thole et al. | 264/83 |

FOREIGN PATENT DOCUMENTS

| | | | | |
|---|---|---|---|---|
| CA | 2162752 | | | 5/1996 |
| DE | 2343427 | C3 | | 3/1975 |
| DE | 3914106 | A1 | | 10/1990 |
| EP | 0383572 | A2 | | 8/1990 |
| EP | 0839616 | B1 | | 4/2002 |
| WO | wo-92/01540 | A1 | * | 2/1992 |
| WO | WO95/20473 | | | 8/1995 |
| WO | WO 95/20473 | | * | 8/1995 |
| WO | WO96/31327 | | | 10/1996 |
| WO | WO97/04933 | | | 2/1997 |
| WO | WO97/32701 | | | 9/1997 |

* cited by examiner

*Primary Examiner*—Sam Chuan Yao
(74) *Attorney, Agent, or Firm*—Jacobson Holman PLLC

(57) ABSTRACT

A method of manufacturing plates, such as chipboards, fibre boards and the like boards, where the raw material in form of biomass particles, such as wood chips, wood fibres and the like applied with a thermosetting binder is spread onto a preforming band into an endless mat, and where this mat (B) is pre-compressed in a continuously operating prepress (C ) and then completely pressed in a continuously operating hot press, whereby the mat (B) is compressed into the desired thickness of the finished plate and the thermosetting binder is hardened. According to the invention, the mat (B) is pretreated by means of steam immediately before the introduction into the hot press (E) by means of a device (F) so as to obtain predetermined gradients of moisture content and temperature across the thickness of the mat. As a result the capacity of the apparatus can be increased at the same time as the energy consumption can be reduced. Furthermore, the dimensions and hydraulics of the press (E) can be reduced to a predetermined capacity. Finally, the possibility of controlling the total processing is improved concerning achievement of predetermined qualities of the finished plate characterized by the density profile of said plate across the thickness of said plate.

10 Claims, 11 Drawing Sheets

Determination of the transverse tensile strength

METHOD OF MANUFACTURING CHIPBOARDS, FIBRE BOARDS AND THE LIKE BOARDS

TECHNICAL FIELD

The invention relates to a method of optimizing the production capacity and the flexibility of the product properties when manufacturing chipboards, fibre boards and the like boards by a continuous process, where a thermosetting binder is applied onto the raw material in form of biomass particles, such as chips, fibres and the like, said raw material being spread on a preforming band to form an endless mat, where said mat is preferably pre-compressed in a continuously operating prepress and finally pressed in a continuously operating hot press in such a manner that said mat is compressed into the desired thickness of the finished plate and the thermosetting binder is hardened.

BACKGROUND ART

Above all, the hot press is essential to the production capacity of an apparatus and for the properties of the product, said hot press having two basic functions viz. to compress a mat of biomass particles glued to the desired thickness of the plate and to heat said mat to a temperature causing a hardening, i.e. a polymerisation/condensation of the binder.

For this purpose, two types of hot presses are used, viz. conventional step presses pressing a section of the mat per pressing cycle and continuously operating through-type presses advancing an endless mat by means of steel bands through a wedge-shaped slot between two pressing planes with the result that said mat is gradually compressed and full-hardened by means of heat from said pressing planes and said steel bands. These modern presses become more and more important and they are expected to dominate the market. The invention is in particular directed towards a use in connection with this type of press.

Below reference is only made to a continuous press, and the capacity of said press depends on

- the capacity of the press for transferring heat from the pressing planes to the steel bands. In this connection, the shape of the roller or slide systems between the pressing planes and the steel bands is of decisive importance, and
- the transfer of heat from the steel band to the mat of wood particles and through said mat which is to be heated to approximately 105 to 110° C. in the middle in order to harden the binder.

In practice, the heat transfer in the mat turns out to be the limiting factor. The thermal conductivity in the mat is very poor, and accordingly attempts have been made at optimizing the so-called "Dampfstoss-Effekt", which is a German technical term meaning that the moisture in the surface of the mat evaporates and moves towards the centre of the mat where the steam condenses and releases its evaporation heat.

FIG. 4 shows an example of the temperature course at four different depths of the mat versus the time and consequently the position of the measuring location above the pressing length. The curve segments with a steep temperature gradient represent the "Dampfstoss-Effekt" in the layer in question. The flat temperature gradients represent the heat conducting phase taking over when steam is no longer supplied from the outside.

It appears that the heat conducting phase requires most time and restricts the advancing speed and consequently the capacity of the press.

Thus the "Dampfstoss-Effekt" is the ideal mechanism for transferring heat.

It is, however, subject to limitations because a high steam pressure in the middle layer may cause steam burstings in said middle layer when the plate is leaving the press. The more water/steam that is supplied for heating the mat, the more time the plate must remain under a slight pressure in the press so that the steam can finally condense or escape from the middle layer.

Thus an optimizing of the capacity of the press by means of water/steam dosing presents a compromise between two counter-acting effects.

The conventional method of pressing chipboards or fibre mats in a continuous hot press has, however, not only a limiting effect on the capacity of the press, but also a negative effect on the properties of the product.

The latter situation has been illustrated in the following example showing a conventional pressing of a fibre mat into an MDF plate, cf. FIG. 6A.

A precompressed 80 mm thick mat of glued wood fibres with a moisture content of 9 to 10% corresponding to a 16 mm thick MDF plate is introduced in a continuous press and subjected to a compressing in the first section of the press by means of a very high pressure, usually of the magnitude of 40 to 50 kp/cm$^2$, into a thickness usually being 5 to 10% smaller than the final thickness of the plate, cf. FIG. 6A-2. FIG. 6A-2 shows the distance of the pressing planes, i.e. the thickness of the mat, over the length of the press, and FIG. 6A-1 shows the specific pressure in the mat over the length of the press.

The high pressure in the first phase and the heating from the press bands (t~200° C. or more) result in a plastifying and compression of the fibres in the outermost layer of the mat into a density often in the range of 1000 to 1100 kg/m$^3$ for standard MDF-plates.

The pressure is then reduced in the second phase to for instance 1 to 3 kp/cm$^2$ so as to improve the permeability of the middle layer to the steam penetrating from the heated cover layer. As a result the thickness of the mat increases to approximately 25 mm in the illustrated example.

After the heating of the mat to approximately 100° C., the distance of the pressing planes is adjusted to the final thickness of the plate with the effect that the pressure is increased to for instance 5 to 10 kp/cm$^2$ so as finally to decrease towards 0 at the termination of the third phase, viz. the calibration phase.

The described method is a method known especially within the MDF industry and it is suited for achieving specific density profiles, cf. FIG. 5. It is, however, encumbered with a few essential draw-backs which can be avoided by the use of the invention:

- The high pressure in the first phase presents very high mechanical requirements to the press, and it involves a risk of band and rollers being damaged when the mat contains foreign bodies, such as compact fibre lumps, glue lumps and the like being undetectable by means of a metal detector.
- The very low pressure in the second phase is necessary due to the penetration of steam into the middle layer and the heating of said middle layer, but it implies that the glue full-hardens partially without the particles having sufficient mutual contact.
- The terminating compression during the calibration in phase 3 is even worse for the process because the glue bridges established under the low pressure in phase 2 are broken under the higher pressure in phase 3.

All things considered, this method is solely intended for achieving a specific density profile, but it is not suited for achieving an optimum utilization of the binder. Thus the transverse tensile strength of the plate can vary a great deal, and the damage in the middle layer is not always associated with the lowest density, cf. FIG. 7.

Various suggestions have been made:

A drying of the wood material to a low moisture percentage, such as 5 to 6% followed by a spraying of water on the mat immediately before the press. The latter is in principle an efficient method because the potential amount of steam for the heat transfer is increased without increasing the total amount of moisture and consequently the risk of steam burstings. It is, however, difficult to control the procedure, and in addition it is not possible immediately before the press to apply water onto the bottom side of the mat. The result can be asymmetrical cross sections of the plates and curved plates.

A preheating of the mat by means of high-frequency waves to 50 to 60° C. or more in such a manner that the necessity for a heating in the press is reduced to a level which can be established by means of a moderate "Dampfstoss-Effekt". The process is difficult to control because even insignificant moisture variations in the mat result in a heterogeneous heating, the dielectric constant of water being approximately 80 times higher than the one for wood. In addition, a heating of the middle layer involves a plastifying which is not desired because the middle layer must be able to offer resistance at the compressing and hardening of the surface of the mat during the first phase of the pressing.

A preheating and a setting of the optimum moisture content in the mat have furthermore been tested by means of superheated steam of a temperature of 110 to 140° C., conditioned hot air carried through the mat before the hot press and of a dew point temperature corresponding to the desired moisture content.

The patent literature discloses several methods based on the above principles. These methods are characterised by trying to obtain a flow through the mat and consequently a uniform temperature and a homogeneous moisture content in the entire cross section of the mat.

The above methods are not advantageous because of the undesired plastifying of the middle layer and the not-optimum "Dampfstoss-Effekt", where the moisture content and the temperature are also increased in the middle layer of the mat, and accordingly it is the object of the invention to obtain a specific and controllable gradient of the moisture content and the temperature in the mat immediately before the continuously operating press.

BRIEF DESCRIPTION OF THE INVENTION

This object is according to the invention obtained by subjecting the mat immediately before the introduction into the hot press to a pretreatment with steam, whereby the length being subjected to the steam treatment depends on the measured density profile in such a manner that a gradient of the moisture content/temperature is obtained across the thickness of the mat which is optimal with respect to the plastifying degree for a desired product quality and a predetermined pressing process. As a result, the capacity of the apparatus can be increased at the same time as the energy consumption is reduced. Furthermore, the dimensions of the press can be reduced.

Moreover, the mat may according to the invention have a temperature of preferably below 40° C. before the pretreatment.

Furthermore, the mat may according to the invention have a moisture content of preferably less than 5% relative to the dry weight of said mat before the pretreatment.

The pretreatment can advantageously be carried out with saturated water steam at a temperature of 100 to 115° C., preferably 102 to 110° C., especially in the range 104 to 108° C.

Moreover, the pretreatment may according to the invention be carried out at a steam pressure of 0.1 to 0.5 bar overpressure, preferably 0.2 to 0.4 bar overpressure.

The introduction of steam may advantageously be controlled such that the gradient of temperature and the moisture content are adjusted to the subsequent hot pressing parameters and the plastifying and compressing of the mat in order to achieve a predetermined density profile of the finished plate. The pretreatment is controlled such that steam burstings in the finished plate in the press outlet are avoided partly by way of an optimizing of the moisture profile in the mat and partly by way of keeping the total moisture content in the mat at less than 10%, preferably less than 8% of dry weight of the mat.

BRIEF DESCRIPTION OF THE DRAWINGS

The invention is explained in greater detail below with reference to the accompanying drawing, in which FIG. 3*a*-1 is a sectional view taken along line 3*a*-1—3*a*-1 of FIG. 2, FIG. 3*a*-2 is a sectional view taken along line 3*a*-2—3*a*-2 of FIG 2, FIGS. 6B-1 and 6B-2 illustrate examples of pressure and distance control in a continuous hot press according to the invention.

BEST MODE FOR CARRYING OUT THE INVENTION

The invention relates to a method and an apparatus for continuously producing plates, such as chipboards, fibre boards and the like boards, where the raw material in form of biomass particles, such as wood particles, wood fibres and the like fibres, and applied a thermosetting binder is spread on a preforming band into an endless mat, said mat subsequently being pre-compressed in a continuously operating prepress and then pressed in a continuously operating hot press, wherein the mat is compressed into the desired thickness of the finished plate and the thermosetting binder is hardened.

According to the invention the mat is pretreated immediately before the introduction into the hot press E with water steam in such a manner that a specific gradient of the moisture content and the temperature is obtained which is optimal for a predetermined pressing processing and a desired product quality.

Figure 1:
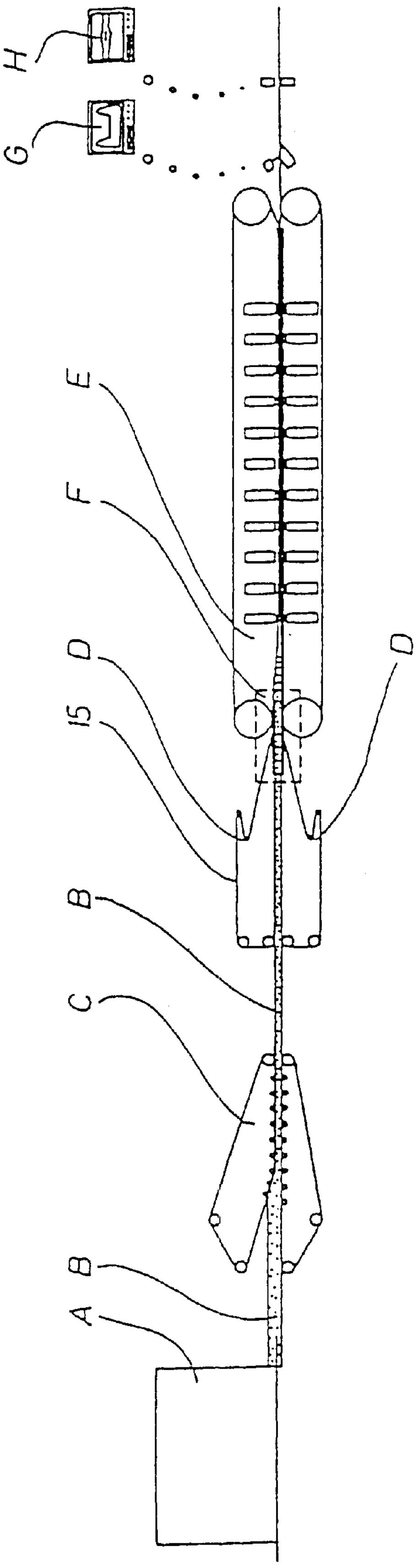
FIG. 1 illustrates an apparatus in form of a production line for continuously producing biomass-based plates, including chipboards and fibre boards.

FIG. 1 shows a production apparatus in form of a production line for continuously producing biomass-based plates, including especially, but not exclusively wood-based chipboards and fibre boards.

Figure 2:
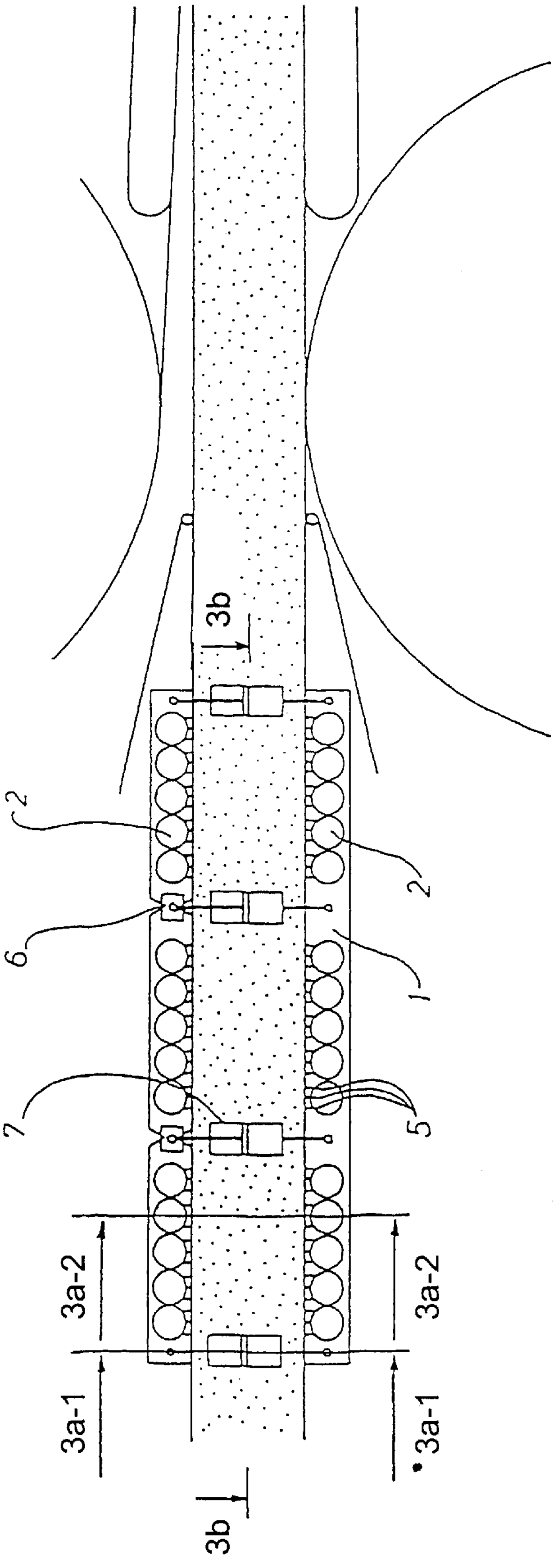
FIG. 2 is a side view on a larger scale of the inlet portion of the continuously operating press shown in FIG. 1 including an apparatus for steam processing according to the invention.
Figures 1, 3A:
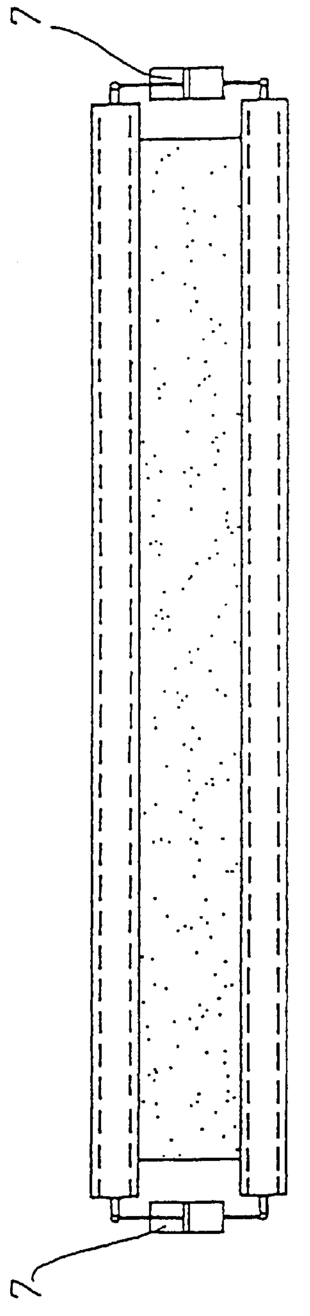
Figures 2, 3A:
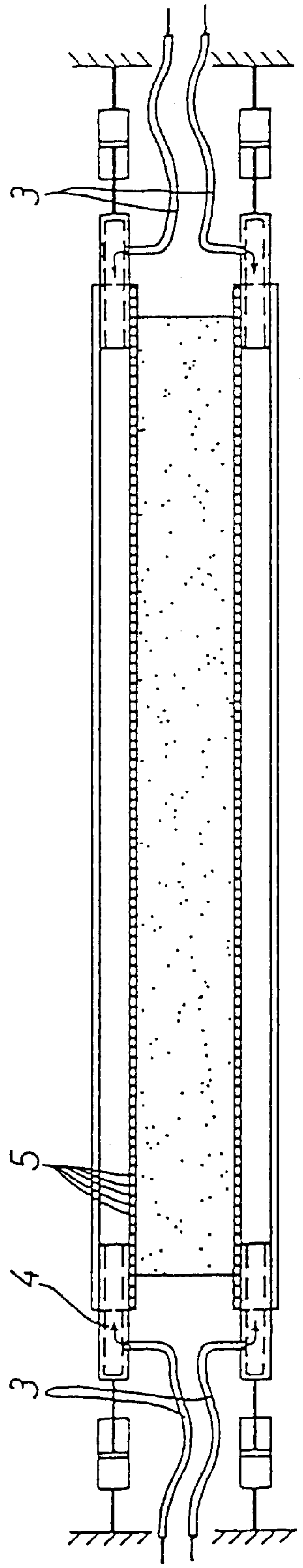
Figure 3B:
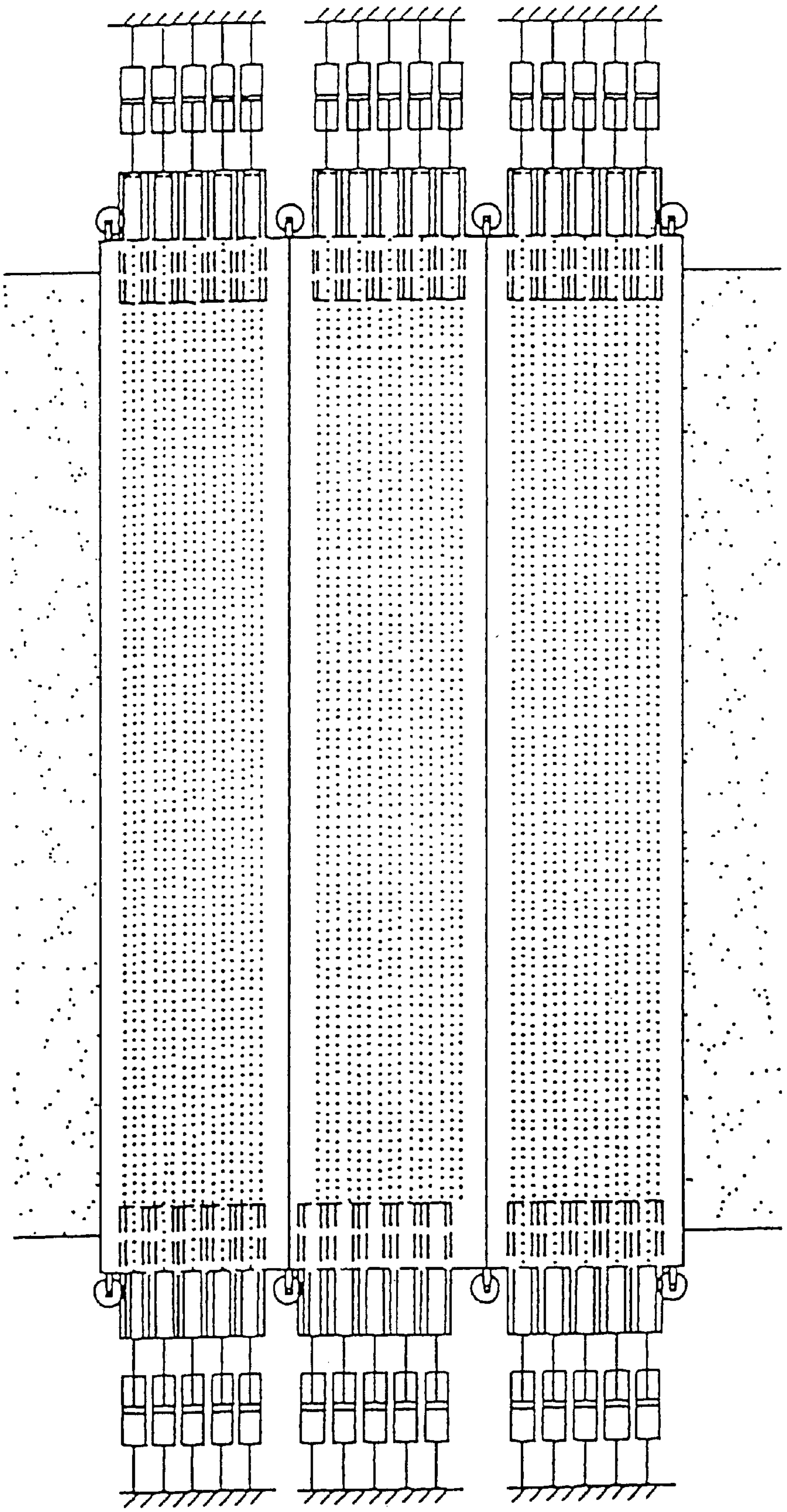
FIG. 3*b* is a sectional view taken along line 3*b*—3*b* of FIG. 2, FIGS. 4*a* and 4*b* show examples of the temperature course at four different depths of the mat versus the time and by means of conventional heating technique.

The apparatus F for steam injection is shown in greater detail in FIGS. 2 and 3.

Above all, the hot press E is of vital importance for the capacity of a production line and the properties of the products, said hot press having two basic functions:

compressing a mat B comprising glued biomass particles into the desired thickness of the plate, heating the mat B to a temperature causing the binder to harden, i.e. polymerising/condensing, For this purpose two types of hot presses are used, viz.

conventional step presses pressing a section of the mat per pressing cycle, continuously operating through-type presses, wherein an endless mat B is carried by means of steel bands 11 through a wedge-shaped slot between two pressing planes 12, whereby the mat B is gradually compressed and full-hardened by the heat from said pressing planes 12 and said steel band 11. Such presses have become more and more important and are expected to dominate the market within a few years. The invention is in particular directed towards a use in connection with such a press.

The positioning of the hot press E in the production line is shown in FIG. 1.

Below reference is only made to a continuous press, and the capacity of said press depends on the capacity of the press to transfer heat from the pressing planes 12 to the steel bands 11. In this connection, especially the shape of the roller or slide systems 13 between the pressing planes 12 and the steel bands 11 is of decisive importance.

the transfer of heat from the steel bands 11 to the mat of wood particles and through said mat which is to be heated to approximately 105 to 110° C. in the middle in order to harden the binder. In practice, the heat transfer in the mat B turns out to be the limiting factor, The thermal conductivity in the mat B is very poor, and accordingly attempts have been made at optimizing the so-called "Dampfstoss-Effekt", which is a German technical term meaning that the moisture in the surface of the mat B evaporates and moves towards the centre of the mat B where the steam condenses and releases its evaporation heat.

Figure 4A:
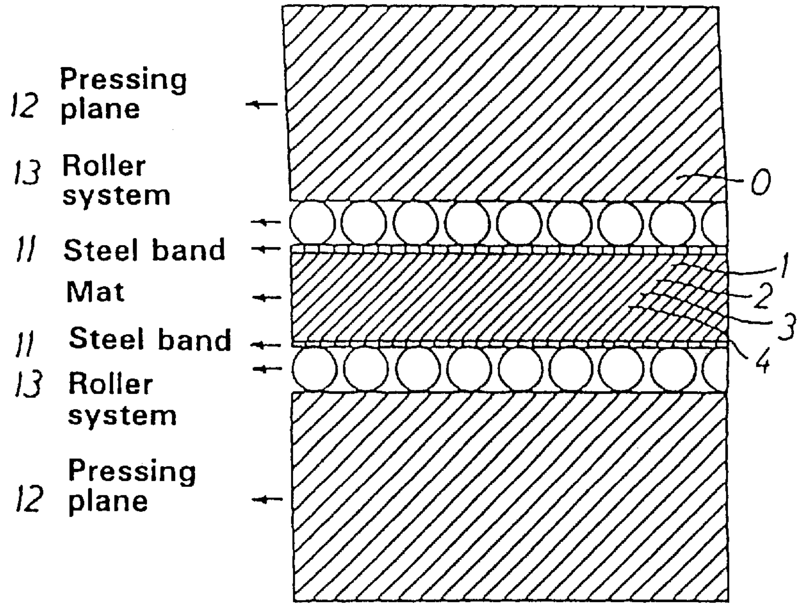
Figure 4B:
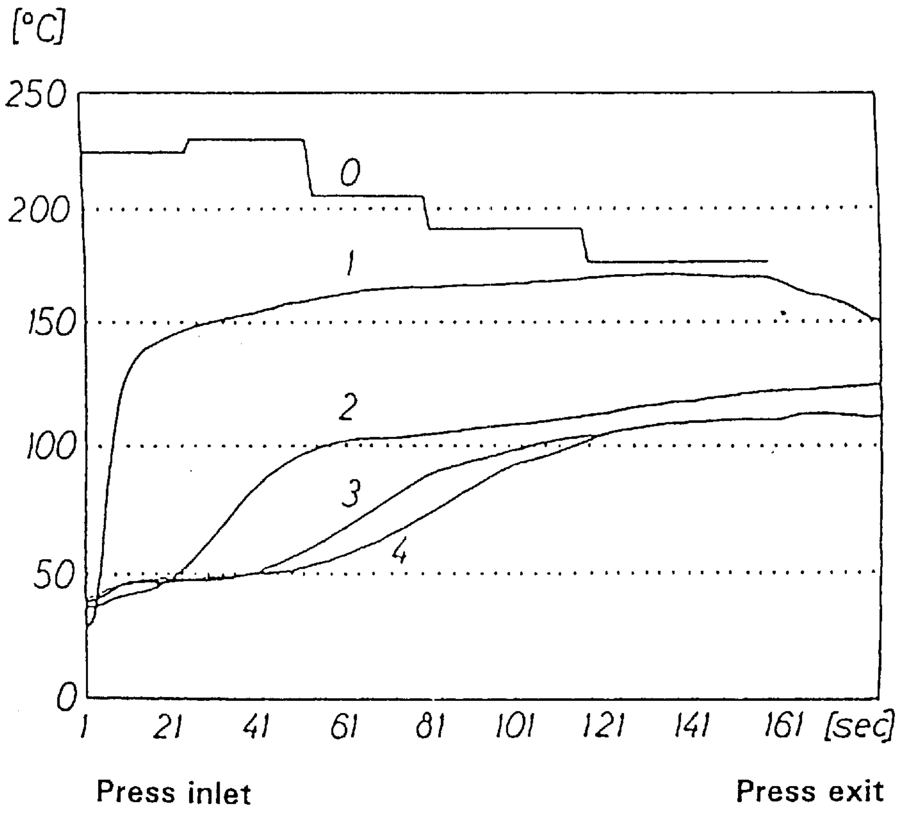

FIG. 4 shows an example of the temperature course at four different depths of the mat B versus the time and consequently the position of the measuring location above the pressing length. The curve segments with a steep temperature gradient represent the "Dampfstoss-Effekt" in the layer in question, whereas the flat temperature gradients represent the heat conducting phase taking over when steam is no longer supplied from the outside.

It appears that the heat conducting phase requires most time and restricts the advancing speed and consequently the capacity of the press E.

Thus the "Dampfstoss-Effekt" is an ideal mechanism for transferring heat, but it is of limited use because a high steam pressure in the middle layer ML may cause steam burstings in said layer when the plate exits the press E. The more steam that is supplied in connection with the through heating of the mat B, the longer period the plate must remain under a slight pressure in the press E so that the steam can finally condense or escape from the middle layer ML.

Thus an optimizing of the capacity of the press E by means of water/steam dosing presents a compromise between two counter-acting effects.

Various suggestions have been made:

Drying of the wood material to obtain a low moisture percentage, such as 5 to 6% followed by a spraying of water on the mat immediately before the press E. In principle, the latter is an efficient method because the potential amount of steam for the heat transfer is increased without increasing the total amount of moisture and consequently the risk of steam burstings in the plate. It is, however, difficult to control the procedure, and in addition it is not possible immediately before the press E to apply water onto the bottom side of the mat. The latter may result in asymmetrical cross sections of the plate and curved plates.

A preheating of the mat B by means of high-frequency waves to 50 to 60° C. or more in such a manner that the necessity for a heating in the press E is reduced to a level which can be established by means of a moderate "Dampfstoss-Effekt". The process is difficult to control because even insignificant moisture variations in the mat B result in a heterogeneous heating, the dielectric constant of water being approximately 80 times higher than the one for wood. In addition, a heating of the middle layer ML of the mat B involves a plastifying which is not desired because the middle layer ML must be able to offer resistance at the compressing and hardening of the surface DL of the mat B during the first phase of the pressing.

A preheating and a setting of the optimum moisture content in the mat B have furthermore been tested by means of various combinations of superheated steam of a temperature of 110 to 140° C., conditioned hot air carried through the mat B before the hot press E and of a dew point temperature corresponding to the desired moisture content.

These methods are characterised by trying to obtain a flow through the mat B and consequently a uniform temperature and a homogeneous moisture content in the entire cross section of the mat B.

In view of

The undesired plastifying in the middle layer ML, the not-optimum "Dampfstoss-Effekt", where the moisture content and the temperature are also increased in the middle layer ML of the mat B, the above is not advantageous, and accordingly it is the object of the invention to obtain a specific and controllable gradient of the moisture content and the temperature in the mat B immediately before the continuously operating press E.

The method is carried out as follows:

Immediately before the press E, the pre-compressed mat B is supplied with saturated steam at a temperature of preferably, but not exclusively 105 to 110° C. corresponding to an overpressure of 0.2 to 0.4 bar. The position of the press E in the production line appears from FIG. 1. The detailed structure of the press inlet and the apparatus F for injection of steam according to the invention appears from FIGS. 2 and 3.

A device comprising a plane below and a plane above the mat B is accommodated directly in the inlet of the continuously operating press E, preferably, but not exclusively as an integrated portion of a retractable feeding device D. These planes are provided with channels 2 for distribution of steam across the width of the production line, and they comprise bores in the surface for the feeding of steam to the mat B being advanced between said planes by means of strainer bands 15, i.e. permeable bands made of textile or metal tissue or the like tissue.

The planes are structured as shown in FIGS. 2 and 3.

The bottom plane 1 is shaped as a coherent plane with cylindrical channels parallel to the plane 1, but perpendicular to the introduction direction of the mat B. The steam is supplied through resilient coils 3 to the channels 2 through pistons 4 in form of tubes, cf. FIG. 3. The tubes can be moved and positioned in the outermost portion of the channels 2. Steam to the mat B leaks through bores 5 in the surface of the planes, and the leaking can be limited by means of the pistons 4 to the portion of the width of the production line which is relevant for a predetermined production width. The production width can vary according to desire by means of the spreading machine A.

The upper plane is structured correspondingly concerning the introduction of steam, but it comprises segments interconnected through hinges 6 with the result that each segment can be pressed downwards by means of hydraulic cylinders 7 towards the strainer bands 15 and the mat B in such a manner that a leaking of steam between the plane, the strainer bands 15 and the mat B can be limited.

The structuring of the planes for steam processing in form of modules allows a simple adjustment of the capacity, viz. the length being processed, to the instant advancing speed associated with the length and capacity of the hot press E in question.

The supply of steam can be adjusted to each segment or to each channel 2. The pressure and the temperature can also be adjusted individually.

In this manner the penetration of steam and the heating can be completely or partially limited to the cover layer in accordance with a profile which can be maximally adjusted to a predetermined processing and a desired product quality.

An in-line determination of the density profile in the finished plate after the hot press E is used as auxiliary means for the adjustment of the moisture and the temperature profile in the mat B, cf. FIG. 1.

Correspondingly the detector H is used as auxiliary means for the control of the total supply of moisture to the mat B, said detector appearing from FIG. 1 and detecting a possible formation of blisters caused by a too high steam pressure.

Figure 5A:
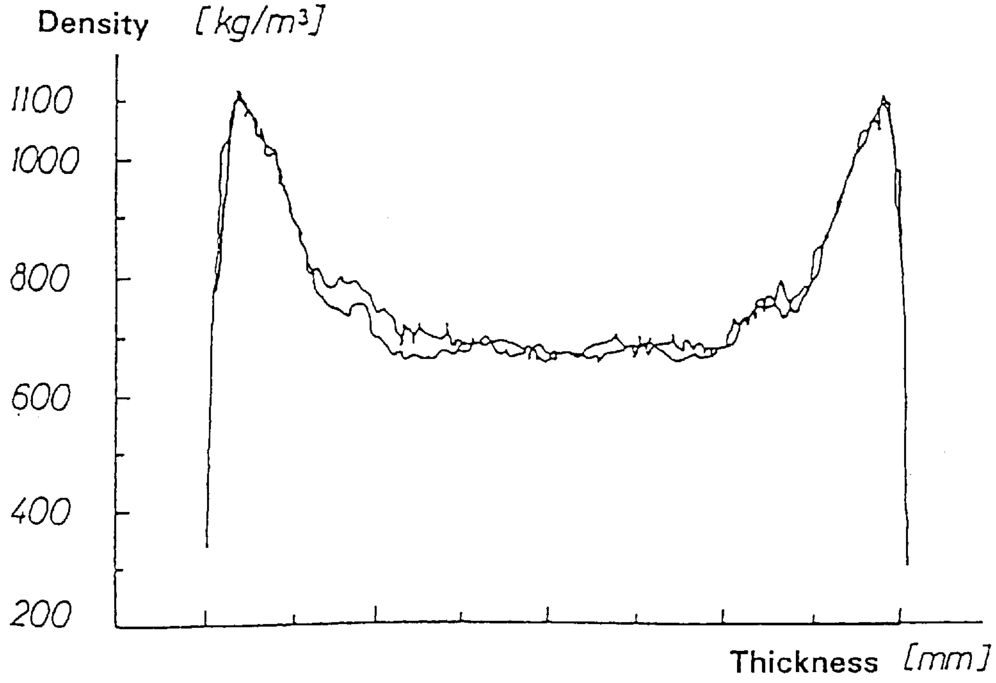
FIG. 5A illustrates an example of a density profile of an MDF plate.

The effect of the above setting of a specific moisture and temperature profile in the cross section of the mat B is illustrated by means of a calculation example performed on a typical quality of MDF (Medium Density Fibreboard) with an average density of 800 kg/m$^3$ and a density profile as shown in FIG. 5A.

Figure 5B:
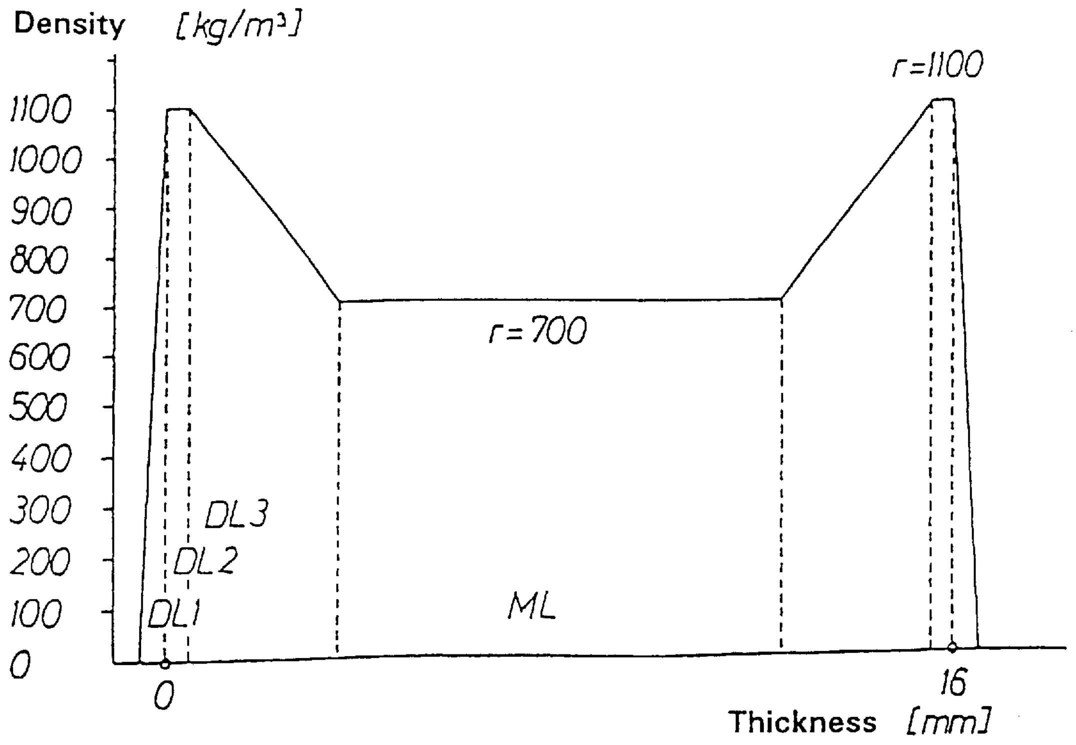
FIG. 5B illustrates a simplified model profile with the same main data as in FIG. 5A, FIGS. 6A-1 and 6A-2 illustrate examples of pressure and distance control in a continuous hot press according to the prior art.

In order to simplify the calculations, this profile has been replaced by a geometrically formalized profile with the same main data as the actual profile, cf. FIG. 5B.

The layer structure of the plate is as follows:

The cover layer DL dividable into three layers:

a loose layer DL1 resulting from a prehardening of the surface before a full pressure has been established, here assumed with a thickness of 0.5 mm and an average density of 550 kg/m$^3$. This layer is usually buffed off.

DL2, density maximum, the thickness is here 0.5 mm, the average density is 1100 kg/m$^3$.

DL3, transition to the middle layer ML, here assumed with a thickness of 3 mm, density 1100→700 kg/m$^3$.

The middle layer ML, thickness 9 mm, average density 700 kg/m$^3$,

Cover layer DL identical with the above layer.

After the buffing off of the loose surface, the thickness is 16 mm, and the total density is 800 kg/m$^3$.

For this purpose a fibre mat is required, said mat in the following calculations being divided into a cover layer DL, and a middle layer ML corresponding to the finished plate.

The mat is assumed to be spread with a moisture content of 5% and a temperature of 40° C., said temperature having dropped in the surface to 30° C. on the way from the spreading station A to the press E.

| The mat before steam processing | | | The mat after steam processing | The plate after hot pressing |
|---|---|---|---|---|
| | | P = 0.2 to 0.4 bar<br>t = 105 to 110° C.<br>Q = 540 kcal/kg<br>STEAM<br>⇓ | | |
| COVER LAYER DL | | | | |
| surface weight 3.525 kg/m$^2$ | t = 30° C.<br>u = 5% | $^c$fibres = 0.45 kcaf/kg | t = 95° C.<br>u = 5% + Δu | t = 130 to 140° C.<br>u = 5% |
| MIDDLE LAYER ML | | | | |
| surface weight 6.300 kg/m$^2$ | t = 40° C.<br>u = 5% | $^c$fibres = 0.45 kcal/kg | t = 40° C.<br>u = 5% | t = 112° C.<br>u = 11.1% |
| COVER LAYER DL | | | | |
| surface weight 3.525 kg/m$^2$ | t = 30° C.<br>u = 5% | $^c$fibres 0.45 kcal/kg | t = 95° C.<br>u = 5% + Δu | t = 130 to 140° C.<br>u = 5% |
| | | ⇑<br>STEAM<br>P = 0.2 to 0.4 bar<br>t = 105 to 110° C.<br>Q = 540 kcal/kg | | |

It is assumed that the cover layers are heated by means of saturated water steam to 95° C. The latter requires $$\frac{2\cdot 3.525\cdot 0.45\cdot 65}{540}=0.382\ \text{kg/steam}$$

whereby the moisture content in the cover layer in DL is increased to $$5\%+\frac{0.382\cdot 100}{2\cdot 3.525}\%=10.4\%$$

A transfer of the supplied amount of steam to the middle layer ML by way of heating in the press E results in a moistening in the middle layer ML to $$\left(5+\frac{0.382\cdot 100}{6.3}\right)\%=11.1\%$$

and a heating to $$\left(40+\frac{0.382\cdot 540}{0.45\cdot 6.300}\right)^{\circ}\ \text{C.}=112^{\circ}\ \text{C.}$$

Thus the heat supply solely by way of the "Dampfstoss-Effekt" is completely sufficient for hardening the glue in the middle layer ML. In addition, a resulting moisture percentage of 11.1% in the middle layer ML and a total moisture percentage in the mat B of $$\left(5+\frac{0.382\cdot 100}{13.350}\right)\%=7.86\%$$

are completely non-critical with respect to the risk of steam burstings in the finished plate at the press exit. A particular cooling zone in the press E is therefore not necessary.

Figures 1, 6A:
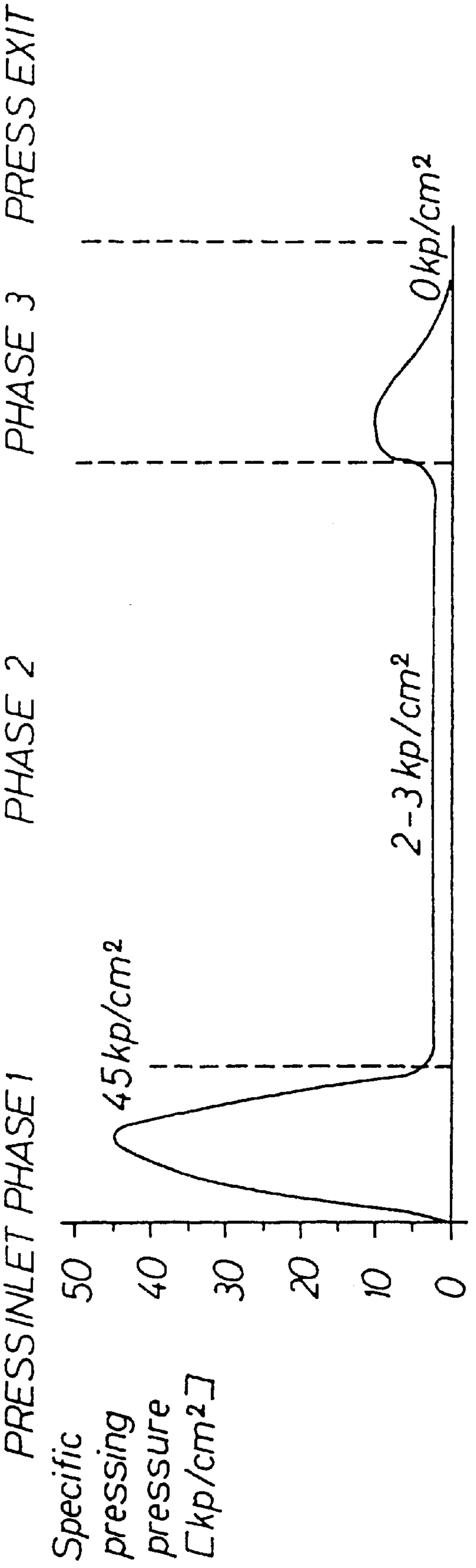
FIG. 6A-1 (PRIOR ART)
Figures 2, 6A:
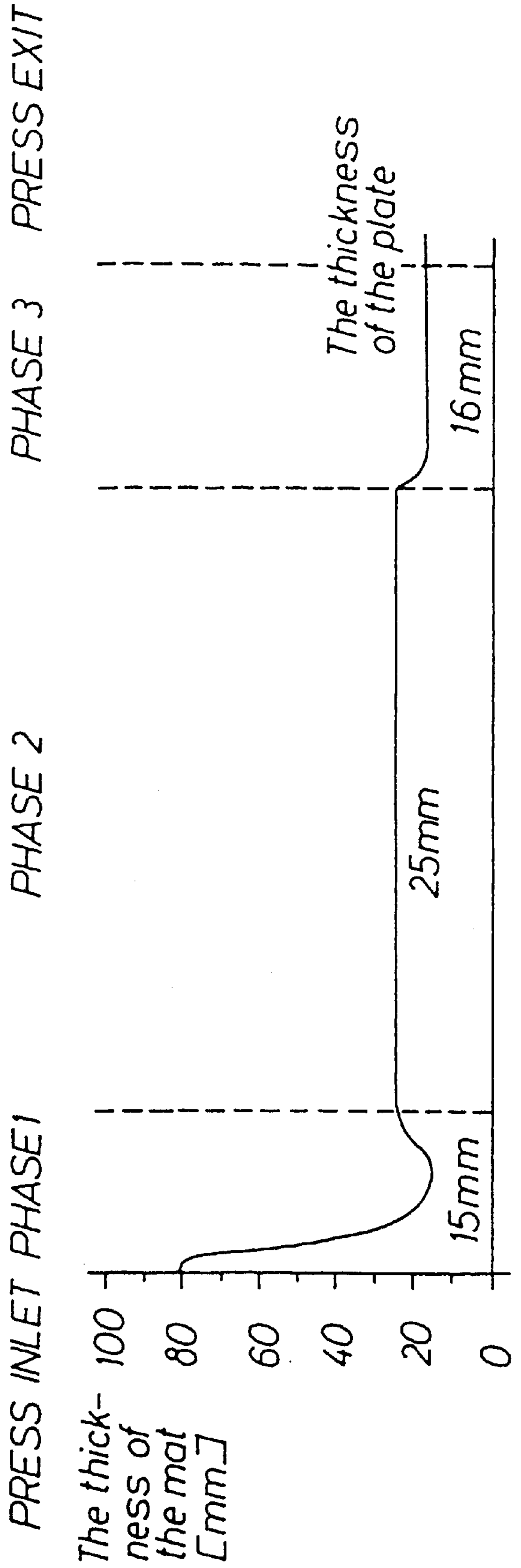
FIG. 6A-2 (PRIOR ART)
Figures 1, 6B:
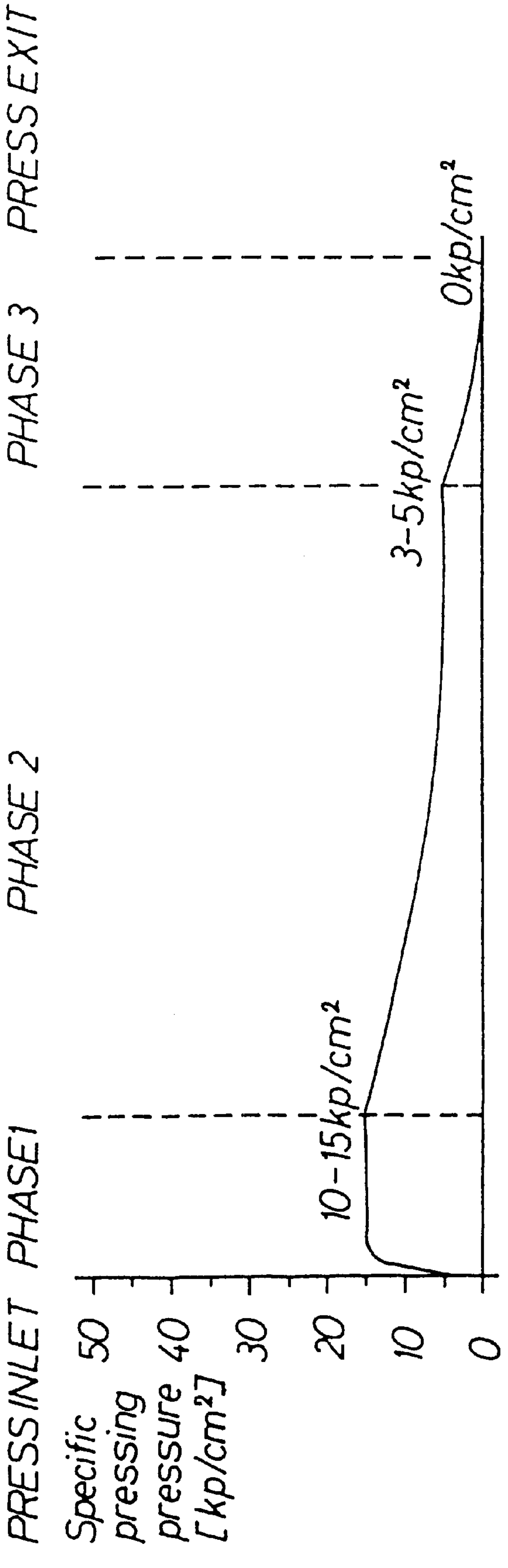
Figures 2, 6B:
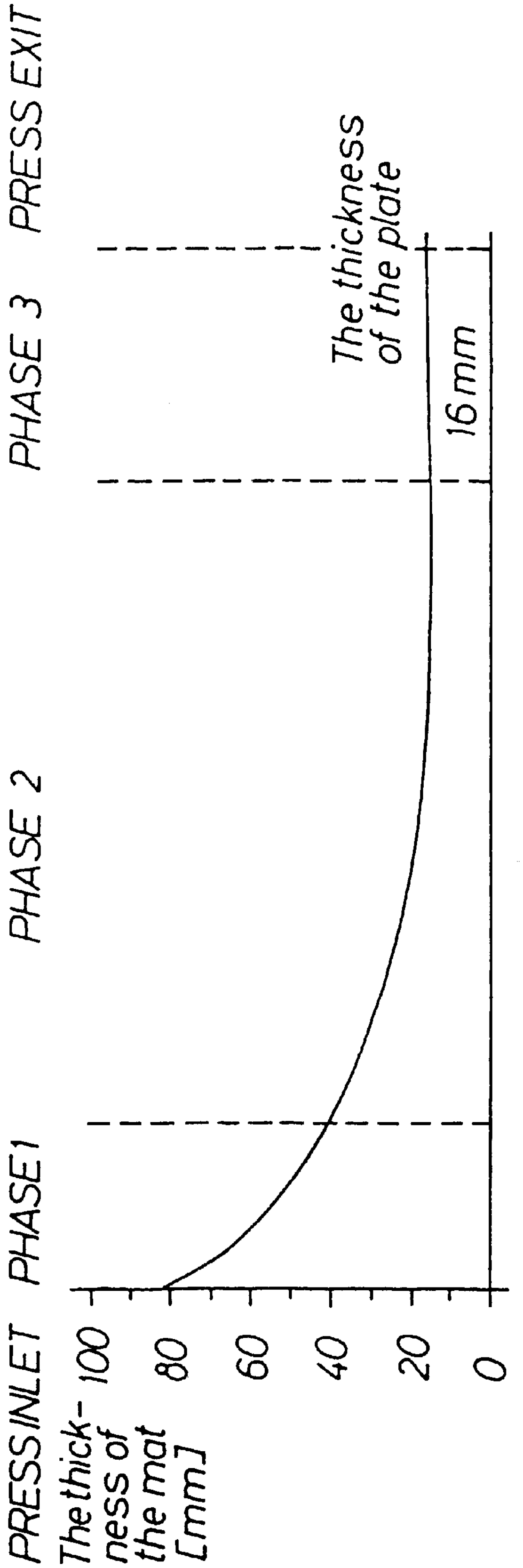
Figure 7:
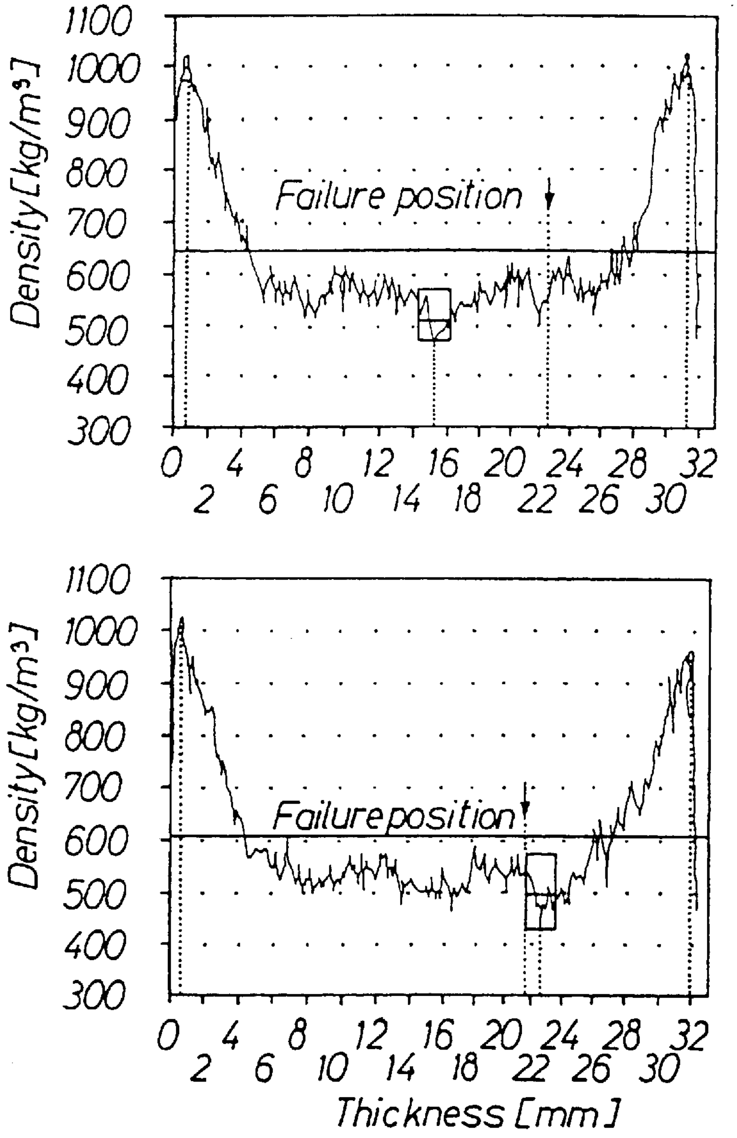
FIGS. 7 and 7A illustrate examples of lacking coincidence of density and transverse tensile strength caused by an inappropriate control of the press.
Figure 7A:
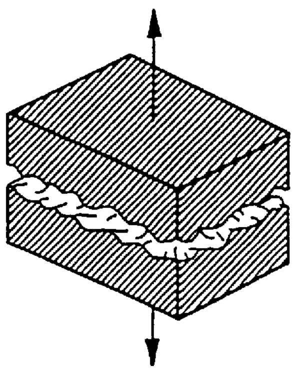

The hot pressing in a continuous press by way of the method according to the invention runs typically in the following manner, cf. FIG. 6B-1 illustrating the pressure course across the length of the press, and FIG. 6B-2 illustrating the distance of the pressing planes across the pressing length.

a preheating of the outer layer of the mat to for instance 103° C. by a steam pressure of 0.1 bar overpressure and a moistening to for instance 10 to 12% result in an intensive plastifying of fibres/chips, and at contact with the hot pressing bands (t>200° C.) this effect is additionally enhanced.

Thus the pressure necessary for achieving a high surface density (1000 to 1100 kg/m$^3$) can be reduced by a factor of the magnitude 3 to 4 or more.

The low pressure in the first phase has the effect that the middle layer of the mat is less compressed than by the conventional method. Accordingly, during the entire pressing procedure the middle layer is d permeable to the penetrating steam from the cover layer, and therefore the heating of said middle layer is carried out very quickly and simultaneously under a pressure providing better possibilities for a contact between the particles during the hardening of the glue than by the conventional technique.

The pressing procedure runs typically as follows:

During phase 1 a pressure is established, which typically is of the magnitude 10 to 15 kp/cm$^2$, which according to the density profile measurements ensures the desired density maximum, typically 1000 to 1100 kg/m$^3$.

This pressure is maintained until the cover layer has achieved the desired thickness. The time necessary is also determined by way of density profile measuring.

The pressure is reduced in phase 2 according to a homogenously decreasing curve, the outline of which is decisive for the structure of the density profile in the middle layer of the plate. The thickness of the mat is registered as a secondary parameter.

When the mat has reached the final thickness of the plate, the distance of the pressing planes take over as primary control parameter in phase 3. The distance is maintained on the final thickness of the plate, and the pressure is registered as a secondary parameter. When the pressure approaches 0, the plate is hardened and the pressing terminated.

The advancing speed of the mat can be adjusted to the specific pressure in the press in phase 3. When the pressure drops to 0 directly before the exit, the speed is suitable. When the pressure drops earlier to 0, the speed can be accelerated without risking steam burstings.

The entire method involving both an establishment of a specific moisture and temperature profile in the thickness of the mat and the illustrated pressing and temperature profile in the continuous hot press ensures the following advantages over the conventional technique:

The heat transfer from the surface of the mat B to the middle layer ML is almost exclusively performed by means of steam from the cover layer DL. As the temperature in the cover layer DL is already close to the boiling point of the water, the "Dampfstoss-Effekt" is initiated very quickly by a contact with the up to 200° C. hot pressing bands.

Almost half the heat energy necessary for hardening the binder is thus supplied in a simple manner before the mat B is introduced into the press E, which represents the most expensive component and simultaneously the capacity-limiting member of the production apparatus.

The low maximum pressure in the press inlet ensures a reduced energy consumption by the compression of the mat and a reduced wear of the mechanical parts of the press.

The use of a pressing procedure involving a moderate, homogenously decreasing pressure ensures the best possible conditions for utilizing the binder and for achieving the best possible transverse tensile strength in the middle layer of the plate.

The use of a moderate compression of the mat during the first phase of the pressing procedure ensures the best possible permeability for the steam from the cover layer and consequently the fastest possible heat transfer to the middle layer.

The total capacity of the apparatus can thus be substantially increased while the energy consumption is simultaneously reduced. As an alternative the size, dimensioning and hydraulics of the press E can be reduced to a predetermined capacity.

The latter is also ensured because the pressure in the hot press E can be substantially reduced by the cover layer being plastified before the pressing.

By setting a specific profile of the temperature and the moisture content in the mat B before the pressing procedure, it is possible to efficiently control the plastifying and compressing procedure in the mat B during said pressing. In other words it is possible to obtain an additional possibility of controlling the density profile and other properties of the end product beyond the possibilities provided by the hot press E per se.

By adjusting and controlling the moisture content and the moisture profile before the hot pressing it is possible to ensure a more reliable basis for the function of the continuous hot press E than by the existing control systems.

The use of an in-line density profile measuring at G and a detection of blisters at H on the finished plate after the press E renders it possible to obtain a direct and clear connection between the process parameters and the product properties, and accordingly it is possible to obtain the desired product properties.

The length being subjected to the steam processing is typically 1 to 2 m, but it depends on the advancing speed and the thickness of the plate.

What is claimed is:

1. A method of optimizing production capacity and flexibility of a density profile when manufacturing boards made of biomass particles by a continuous process, said method comprising the steps of:

applying a thermosetting binder onto a raw material in the form of biomass particles and spreading said biomass particles on a preforming band into an endless mat;

pre-compressing said mat in a continuously operating prepress;

pressing said mat in a continuously operating double band hot press with the heat being provided from the bands where said mat is compressed to a desired thickness of a finished board having opposed cover layers and the thermosetting binder being hardened;

immediately before introducing the mat into an inlet of the hot press, pretreating the mat by injection of steam into both cover layers in such a way that there is a gradient of moisture content and temperature from both cover layers, over the thickness of the mat, to a middle layer, the middle layer maintaining the moisture content and temperature of a starting mixture and an elevated moisture content and elevated temperature only being introduced into the cover layers by the steam pretreatment; and measuring the density profile of the finished board in-line at an outlet of the hot press for determining an amount of the steam used for the pretreatment of the mat at the inlet of the hot press so that the gradient of temperature and moisture content across the thickness of the mat and a gradient of plastifying across the thickness of the mat are controlled to produce a finished board with a required density profile in a predetermined hot pressing process, and whereby transfer of heat utilizing a steam shock effect from the cover layers to a center of the mat during hot pressing is most effective while substantially avoiding steam-burstings of the finished board after the hot press by controlling the total content of moisture in the mat.

2. The method as claimed in claim 1, wherein the mat has a temperature of below 40° C. before the pretreatment.

3. The method as claimed in claim 1, wherein the mat has a moisture content of less than 5% relative to dry weight of the mat before the pretreatment.

4. The method as claimed in claim 1, wherein the pretreatment is performed with saturated water steam at a temperature in the range 102 to 110° C.

5. The method as claimed in claim 1, wherein the pretreatment is performed at a steam pressure of 0.1 to 0.5 bar overpressure.

6. The method as claimed in claim 1, wherein the introduction of steam is controlled in a manner so that the gradient of moisture content is adjusted in dependence of temperature, pressure and positioning of pressing planes along the pressing length to obtain a predetermined density profile of the finished board, the steam pretreatment being controlled such that steam burstings on the finished board in the press outlet are avoided partly by way of establishing the gradient of the moisture content in the mat and partly by way of keeping a total moisture content in the mat at less than 10% of dry weight of the mat.

7. The method as claimed in claim 1, wherein the density profile in the finished board measured immediately after the exit of the hot press is used as the control parameter for the setting of pressure and temperature of the pretreatment by means of steam.

8. The method as claimed in claim 1, wherein a dosing of the total amount of steam used at the steam pretreatment is controlled on the basis of an ultrasonic measuring of beginning steam burstings in the finished board at the outlet of the hot press.

9. A method of optimizing production capacity and flexibility of a density profile when manufacturing boards made of biomass particles by a continuous process, said method comprising the steps of:

applying a thermosetting binder onto a raw material in the form of biomass particles and spreading said biomass particles on a preforming band into an endless mat;

pre-compressing said mat in a continuously operating prepress;

pressing said mat in a continuously operating double band hot press with the heat being provided from the bands where said mat is compressed to a desired thickness of a finished board having opposed cover layers and the thermosetting binder being hardened;

immediately before introducing the mat into an inlet of the hot press, pretreating the mat by injection of steam into both cover layers; and measuring the density profile of the finished board in-line at an outlet of the hot press for determining an amount of the steam used for the pretreatment of the mat at the inlet of the hot press so that a gradient of temperature and moisture content across the thickness of the mat and a gradient of plastifying across the thickness of the mat are controlled to produce a finished board with a required density profile in a predetermined hot pressing process, and whereby transfer of heat utilizing a steam shock effect from the cover layers to a center of the mat during hot pressing is most effective while substantially avoiding steam-burstings of the finished board after the hot press by controlling the total content of moisture in the mat, the mat having a moisture content of less than 5% relative to dry weight of the mat before the pretreatment and the mat having a moisture content of less than 8% by weight after the steam treatment.

10. A method of optimizing production capacity and flexibility of a density profile when manufacturing boards made of biomass particles by a continuous process, said method comprising the steps of:

applying a thermosetting binder onto a raw material in the form of biomass particles and spreading said biomass particles on a preforming band into an endless mat;

pre-compressing said mat in a continuously operating prepress;

pressing said mat in a continuously operating double band hot press with the heat being provided from the bands where said mat is compressed to a desired thickness of a finished board having opposed cover layers and the thermosetting binder being hardened;

immediately before introducing the mat into an inlet of the hot press, pretreating the mat by injection of steam into both cover layers; and measuring the density profile of the finished board in-line at an outlet of the hot press for determining an amount of the steam used for the pretreatment of the mat at the inlet of the hot press so that a gradient of temperature and moisture content across the thickness of the mat and a gradient of plastifying across the thickness of the mat are controlled to produce a finished board with a required density profile in a predetermined hot pressing process, the hot pressing procedure including in a first phase a pressure being established of a magnitude of 10 to 15 kp/$cm^2$, said pressure being maintained until the cover layers have reached the desired thickness, in a second phase the pressure being continuously decreased, and then when the mat having reached the final thickness of the board, a distance between pressing planes takes over as a primary control parameter until the pressure approaches zero and whereby transfer of heat utilizing a steam shock effect from the cover layers to a center of the mat during hot pressing is most effective while substantially avoiding steamburstings of the finished board after the hot press by controlling the total content of moisture in the mat.

* * * * *